US012522515B2

United States Patent
Xu et al.

(10) Patent No.: US 12,522,515 B2
(45) Date of Patent: Jan. 13, 2026

(54) CATHODE MATERIAL FOR SODIUM-ION BATTERIES, PREPARATION METHOD THEREFOR, AND APPLICATION THEREOF

(71) Applicants: JINGMEN GEM CO., LTD, Hubei (CN); GEM CO., LTD, Guangdong (CN)

(72) Inventors: Kaihua Xu, Hubei (CN); Kun Zhang, Hubei (CN); Zhaojian Sun, Hubei (CN); Cong Li, Hubei (CN); Wenguang Wang, Hubei (CN)

(73) Assignees: JINGMEN GEM CO., LTD, Hubei (CN); GEM CO., LTD, Guangdong (CN)

( * ) Notice: Subject to any disclaimer, the term of this patent is extended or adjusted under 35 U.S.C. 154(b) by 0 days.

(21) Appl. No.: 18/832,651

(22) PCT Filed: Apr. 10, 2023

(86) PCT No.: PCT/CN2023/087256
§ 371 (c)(1),
(2) Date: Jul. 24, 2024

(87) PCT Pub. No.: WO2024/178794
PCT Pub. Date: Sep. 6, 2024

(65) Prior Publication Data
US 2025/0145492 A1     May 8, 2025

(30) Foreign Application Priority Data

Feb. 27, 2023 (CN) .......................... 202310167453.2

(51) Int. Cl.
*C01G 53/50*  (2025.01)
*H01M 10/054*  (2010.01)

(52) U.S. Cl.
CPC .......... *C01G 53/50* (2013.01); *H01M 10/054* (2013.01); *C01P 2002/72* (2013.01); *C01P 2004/03* (2013.01); *C01P 2006/40* (2013.01)

(58) Field of Classification Search
CPC .. C01G 53/50; H01M 10/054; C01P 2002/72; C01P 2004/03; C01P 2006/40
See application file for complete search history.

(56) References Cited

FOREIGN PATENT DOCUMENTS

| CN | 1641914 A | 7/2005 |
|---|---|---|
| CN | 101621125 A | 1/2010 |

(Continued)

OTHER PUBLICATIONS

Li et al., "Boosting the redox kinetics of high-voltage P2-type cathode by radially oriented {010} exposed nanoplates for high-power sodium-ion batteries", Oct. 2021, Small Structure, vol. 3, pp. 1-11. (Year: 2021).*

(Continued)

*Primary Examiner* — Daniel S Gatewood
(74) *Attorney, Agent, or Firm* — McDonald Hopkins LLC

(57) ABSTRACT

Provided are a cathode material for sodium-ion batteries, a preparation method therefor, and an application thereof, and the preparation method comprises the following steps: (1) mixing a nickel source, a manganese source, and a magnesium source to obtain a ternary salt solution, adding the ternary salt solution, a precipitating agent, a complexing agent, a boron source solution, and an organic additive to a reaction vessel in parallel flow, and performing a reaction to obtain a B-doped radially-packed hydroxide precursor; and (2) mixing the B-doped radially-packed hydroxide precursor obtained in step (1) with a sodium source, and performing sintering treatment to obtain the cathode material for sodium-ion batteries. In the present application, the chemical composition (B-doping) and microscopic morphology (Continued)

(radial-packed arrangement of primary particles) of the cathode material are synergistically modified and regulated by optimizing the co-precipitation process, so as to improve the element distribution uniformity, structure stability, cycle performance, rate capability, and production efficiency of the cathode material for sodium-ion batteries simultaneously.

19 Claims, 2 Drawing Sheets

(56) References Cited

FOREIGN PATENT DOCUMENTS

| CN | 110627127 | A | | 12/2019 | | |
|----|-----------|---|---|---------|---|---|
| CN | 111689528 | A | | 9/2020 | | |
| CN | 111697210 | A | | 9/2020 | | |
| CN | 112758995 | A | | 5/2021 | | |
| CN | 114566632 | A | * | 5/2022 | ............. | C01G 53/44 |
| CN | 114988494 | A | * | 9/2022 | ............. | C01G 53/82 |
| CN | 115000399 | A | | 9/2022 | | |
| CN | 115650318 | A | | 1/2023 | | |
| CN | 117374248 | A | | 1/2024 | | |
| JP | 2002042812 | A | | 2/2002 | | |

OTHER PUBLICATIONS

Li et al, "Boosting the redox kinetics of high-voltage P2-type cathode by radially oriented {010} exposed nanoplates for high-power sodium-ion batteries," Small Structure, vol. 3 2021, pp. 1-11.
Patent Cooperation Treaty (PCT), International Search Report for Application PCT/CN2023/087256 filed on Apr. 10, 2023, mailed Oct. 19, 2023, International Searching Authority, CN.
State Intellectual Property Office of People's Republic of China, Notification of First Office Action for Application No. 202310167453.2, report issue date Nov. 23, 2023 China.
Wang et al., "Suppressing the P2—O2 Phase Transition of Na0.67Mn0.67Ni0.33O2 by Magnesium Substitution for Improved Sodium-Ion Batteries," Angew. Chem. Int. Ed. 2016, vol. 55, pp. 7445-7449.
State Intellectual Property Office of People's Republic of China, Notification of Grant for Application No. 202310167453.2, report issue date Mar. 1, 2024, China.
Grant Notification dated Jul. 15, 2025; Japanese Patent Application No. 2024-544488. 5 pages.

* cited by examiner

CATHODE MATERIAL FOR SODIUM-ION BATTERIES, PREPARATION METHOD THEREFOR, AND APPLICATION THEREOF

CROSS-REFERENCES TO RELATED APPLICATIONS

This application is a national stage application filed under 35 U.S.C. 371 based on International Patent Application No. PCT/CN2023/087256, filed on Apr. 10, 2023, which claims priority to Chinese Patent Application No. 202310167453.2 filed with the China National Intellectual Property Administration on Feb. 27, 2023 the disclosures of which are incorporated herein by reference in their entireties.

TECHNICAL FIELD

The present application belongs to the technical field of sodium-ion batteries, such as a cathode material for sodium-ion batteries, a preparation method therefor, and an application thereof.

BACKGROUND

With the rapidly increasing demand for lithium-ion batteries in the fields of consumer electronics, power batteries, and energy storage, the price of lithium resources remains high, and the supply has become increasingly short. Compared with the lithium-ion batteries, the sodium-ion batteries have a low energy density but advantages in many aspects such as resource reserves, cost, safety, rate capability, and low-temperature performance. From this background, as an alternative route to the lithium-ion batteries, the development of the sodium-ion batteries has great economic value and strategic significance.

The key characteristics of the high-performance sodium-ion battery, such as energy density, cycle life, and rate capability, are mainly determined by the cathode material. $NaNi_xMn_yMg_zO_2$, a transition-metal layered oxide cathode material, has excellent comprehensive performance and an promising commercialization prospect. At present, the main industrial preparation of the cathode materials mainly is the high-temperature solid-phase method and co-precipitation method. Although the high-temperature solid-phase method is simple and can achieve large-scale preparation, the products have uneven distributed chemical components, morphology-irregular and easily agglomerated particles, and low tap density. The above disadvantages can make the different batches of products have poor consistency and pass rate, and the optimal electrochemical performance cannot be achieved.

CN110416521A discloses a magnesium-doped ternary cathode material for sodium-ion batteries and a preparation method therefor, wherein the Mg-doped quaternary $NaNi_{1/3-x}Mg_xMn_{1/3}Fe_{1/3}O_2$ cathode material is constructed by the sol-gel method.

CN109817974A discloses a sodium-ion nickel-manganese-magnesium-iron quaternary cathode material and a preparation method therefor, wherein the $Na_xNi_yMn_zMg_{0.9-y-z}Fe_{0.1}O_2$ with a P2/O3 phase composite layered structure is prepared by the electrospinning technology.

The preparation method adopted by the above solution is the sol-gel method or electrospinning method. In one aspect, the products prepared by these methods are not uniform enough, and have low tap density and poor dispersion; the different batches of products has poor consistency, the material has a low pass rate, and the reliability is poor. In another aspect, these methods cannot achieve industrial-grade large-scale production, and the real commercialization prospect is low. The use of a single modification measure has a limitation on performance improvement, which cannot play a synergistic effect among different modification measures. For the layered oxide cathode material for sodium-ion batteries, it is necessary to inhibit the multiple phase transition to improve structure stability, cycle performance, rate capability, and energy density.

A single modification measure, such as elemental doping, can effectively improve the structure stability but cannot improve the rate capability and energy density.

SUMMARY

The following is a summary of the subject described in detail herein. This summary is not intended to limit the protection scope of the claims.

The present application provides a cathode material for sodium-ion batteries, a preparation method therefor, and an application thereof. In the present application, the chemical composition (B-doping) and microscopic morphology (radial-packed arrangement of primary particles) of the cathode material are synergistically modified and regulated by optimizing the co-precipitation process, so as to improve the element distribution uniformity, structure stability, cycle performance, rate capability, and production efficiency of the cathode material for sodium-ion batteries simultaneously.

The present application adopts the following technical solutions.

In a first aspect, an embodiment of the present application provides a preparation method for a cathode material for sodium-ion batteries, and the preparation method comprises the following steps:

(1) mixing a nickel source, a manganese source, and a magnesium source to obtain a ternary salt solution, adding the ternary salt solution, a precipitating agent, a complexing agent, a boron source solution, and an organic additive to a reaction vessel in parallel flow, and performing a reaction to obtain a B-doped radially-packed hydroxide precursor; and (2) mixing the B-doped radially-packed hydroxide precursor obtained in step (1) with a sodium source, and performing sintering treatment to obtain the cathode material for sodium-ion batteries.

In the embodiment of the present application, an industrialized mature co-precipitation process is used to realize the preparation of B-doped radially-packed cathode material for sodium-ion batteries, and the prepared cathode material can achieve uniform distribution at the atomic level, has good dispersion of spherical particles, and has high tap density; the product has good consistency and repeatability.

Compared with mixed packing and close-packed planar stacking, in one aspect, radial packing can alleviate the particle breakage caused by lattice expansion resulted from Li-ion intercalation to improve the structural strength and cycle performance; in another aspect, radial packing can ensure the exposure of the active crystal plane (010), improve the Li-ion intercalation kinetics, and thus improve the rate capability. In addition, by doping the non-metallic element B, the strong covalent B—O bond is constructed, so that oxygen atoms have more negative charges to reduce the excessive oxidation of oxygen effectively, thereby improving the lattice oxygen stability in the process of high-voltage deep sodium deintercalation, inhibiting multiple phase transition reactions, and increasing the voltage plateau and energy density simultaneously.

In one embodiment, the nickel source in step (1) comprises any one or a combination of at least two of nickel sulfate, nickel chloride, or nickel nitrate.

In one embodiment, the manganese source comprises any one or a combination of at least two of manganese sulfate, manganese chloride, or manganese nitrate.

In one embodiment, the magnesium source comprises any one or a combination of at least two of magnesium sulfate, magnesium chloride, or magnesium nitrate.

In one embodiment, metal ions in the ternary salt solution have a total concentration of 0.5-2.0 mol/L, such as 0.5 mol/L, 0.8 mol/L, 1 mol/L, 1.5 mol/L, or 2.0 mol/L.

In one embodiment, the precipitating agent in step (1) comprises a sodium hydroxide solution with a concentration of 6-10 mol/L (such as 6 mol/L, 7 mol/L, 8 mol/L, 9 mol/L, or 10 mol/L).

In one embodiment, the complexing agent comprises any one or a combination of at least two of aqueous ammonia, oxalic acid, sodium oxalate, or salicylic acid.

In one embodiment, the complexing agent has a concentration of 0.1-0.5 mol/L, such as 0.1 mol/L, 0.2 mol/L, 0.3 mol/L, 0.4 mol/L, or 0.5 mol/L.

In one embodiment, a solute of the boron source solution comprises any one or a combination of at least two of boric acid, boron oxide, or sodium borate.

In one embodiment, the boron source solution has a concentration of 1-3 mol/L, such as 1 mol/L, 1.5 mol/L, 2 mol/L, 2.5 mol/L, or 3 mol/L.

In one embodiment, the organic additive comprises any one or a combination of at least two of ethanol, ethylene glycol, or cetyltrimethylammonium bromide.

In one embodiment, the ternary salt solution in step (1) has a flow rate of 7-9 L/h, such as 7 L/h, 7.5 L/h, 8 L/h, 8.5 L/h, or 9 L/h.

In one embodiment, the precipitating agent has a flow rate of 2-4 L/h, such as 2 L/h, 2.5 L/h, 3 L/h, 3.5 L/h, or 4 L/h.

In one embodiment, the complexing agent has a flow rate of 1-1.5 L/h, such as 1 L/h, 1.1 L/h, 1.2 L/h, 1.3 L/h, 1.4 L/h, or 1.5 L/h.

In one embodiment, the boron source solution has a flow rate of 0.05-0.15 L/h, such as 0.05 L/h, 0.08 L/h, 0.1 L/h, 0.12 L/h, or 0.15 L/h.

In one embodiment, the organic additive has a flow rate of 0.1-0.3 L/h, such as 0.1 L/h, 0.15 L/h, 0.2 L/h, 0.25 L/h, or 0.3 L/h.

In one embodiment, the reaction in step (1) is performed at a temperature of 30-60° C., such as 30° C., 35° C., 40° C., 50° C., or 60° C.

In one embodiment, the reaction is performed at a stirring rate of 250-400 rpm, such as 250 rpm, 280 rpm, 300 rpm, 350 rpm, or 400 rpm.

In one embodiment, the reaction is performed at a pH of 9-12, such as 9, 9.5, 10, 11, or 12.

In one embodiment, in the reaction system, the complexing agent has a concentration of 1.5-3.0 mmol/L.

In one embodiment, washing and drying are performed after the reaction.

In one embodiment, a washing agent of the washing comprises any one or a combination of at least two of hot water, liquid sodium hydroxide, or ethanol.

In one embodiment, the B in the B-doped radially-packed hydroxide precursor in step (1) has a doping amount of 2000-10000 ppm, such as 2000 ppm, 4000 ppm, 6000 ppm, 8000 ppm, or 10000 ppm.

In one embodiment, the sodium source in step (2) comprises sodium hydroxide and/or sodium carbonate.

In one embodiment, a molar ratio of the sodium source to the hydroxide precursor is 1-1.2.

In one embodiment, the sintering treatment is performed at a temperature of 800-1000° C., such as 800° C., 850° C., 900° C., 950° C., or 1000° C.

In one embodiment, the sintering treatment is performed for a period of 10-20 h, such as 10 h, 12 h, 15 h, 18 h, or 20 h.

In a second aspect, an embodiment of the present application provides a cathode material for sodium-ion batteries, and the cathode material for sodium-ion batteries is prepared by the method according to the first aspect.

In a third aspect, an embodiment of the present application provides a cathode sheet, and the cathode sheet comprises the cathode material for sodium-ion batteries according to the second aspect.

In a fourth aspect, an embodiment of the present application provides a sodium-ion battery, and the sodium-ion battery comprises the cathode sheet according to the third aspect.

Compared with the related art, the present application has the following beneficial effects.

(1) In the present application, by promoting the growth of the specific crystal plane of the precursor, the radial-packed microscopic morphology is obtained, and thus the radial-packed microscopic morphology of primary particles can be constructed, which on one aspect can alleviate the particle breakage caused by lattice expansion resulted from Li-ion intercalation to improve the structural strength and cycle performance; in another aspect, the radial packing can ensure the exposure of the active crystal plane (010), improve the Li-ion intercalation kinetics, and thus improve the rate capability.

(2) The button half-battery prepared from the cathode material for sodium-ion batteries has the following test data: the discharge capacity at 0.1 C is 143 mAh/g, the discharge capacity at 2 C rate is 108 mAh/g, and the capacity retention rate after 100 cycles is as high as 92.78%.

(3) Compared with the electrospinning method, hydrothermal method, and sol-gel method, the B-doped radially-packed cathode material for sodium-ion batteries obtained by the industrialized mature co-precipitation process can achieve uniform distribution at the atomic level, has good dispersion of spherical particles, and has high tap density; the product has good consistency and repeatability, and is easy to scale up for mass production.

(4) In the present application, the battery prepared from the cathode material for sodium-ion batteries has a discharge capacity at 0.1 C of more than or equal to 138 mAh/g, a discharge capacity at 2 C of more than or equal to 105 mAh/g, and a capacity retention rate after 100 cycles of more than or equal to 87.53%, which indicates that an appropriate doping amount of B can improve the structure stability and the cycle performance.

Other aspects can be appreciated upon reading and understanding the detailed description and accompanying drawings.

BRIEF DESCRIPTION OF DRAWINGS

The accompanying drawings are used to provide a further understanding of the technical solutions herein, and form a part of the specification, which are used together with embodiments of the present application to explain the technical solutions herein, and do not constitute a limitation on the technical solutions herein.

FIG. 1 is an XRD pattern of the cathode material for sodium-ion batteries in Example 1 of the present application.

DETAILED DESCRIPTION

Figure 1:
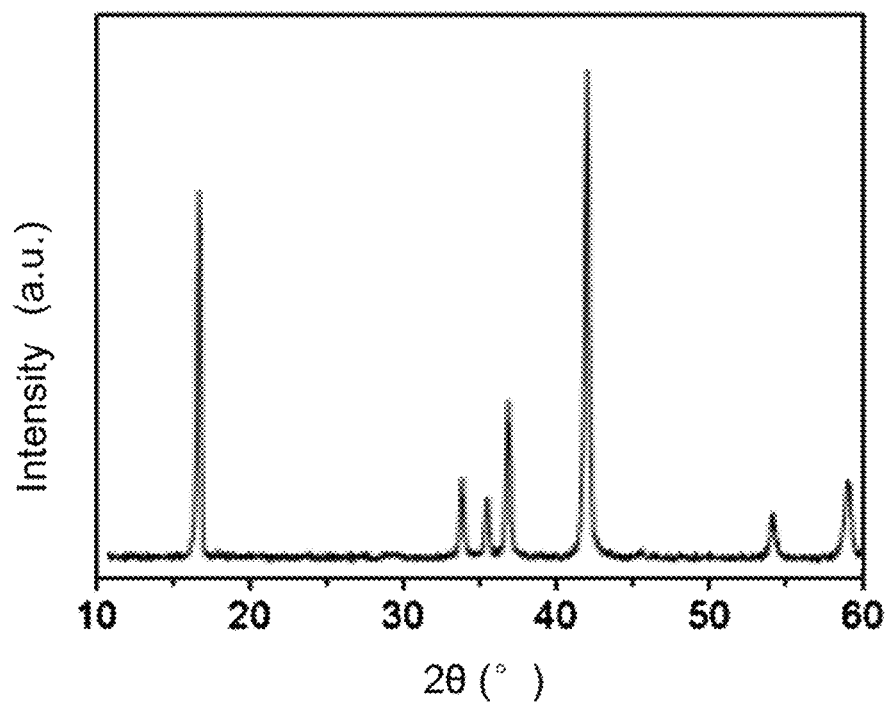
Figure 2:
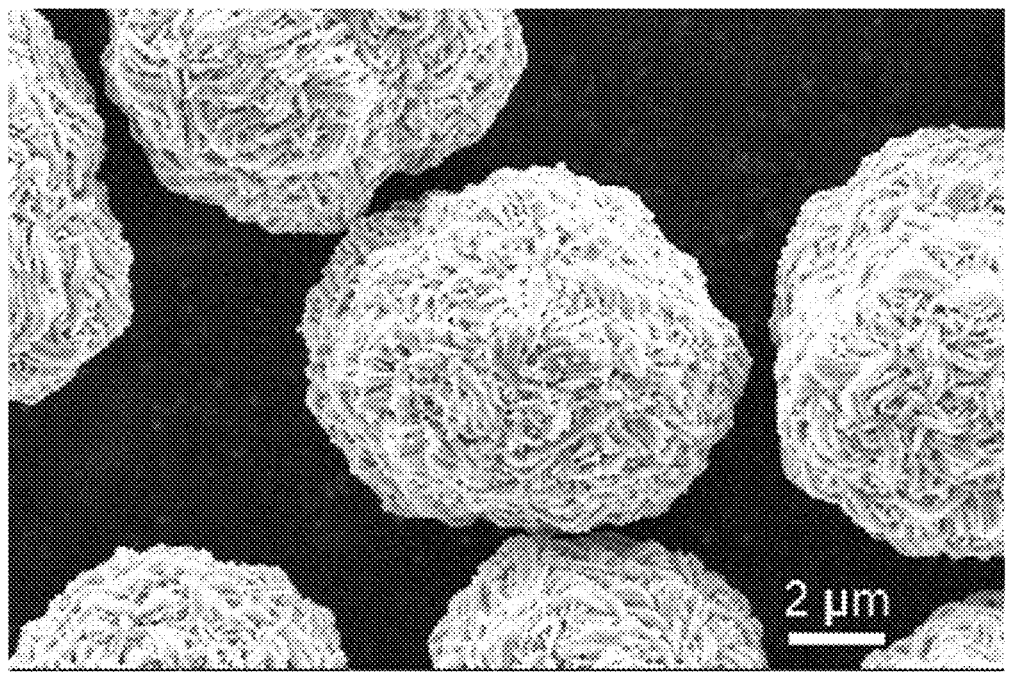
FIG. 2 is an SEM image of the cathode material for sodium-ion batteries in Example 1 of the present application.
Figure 3:
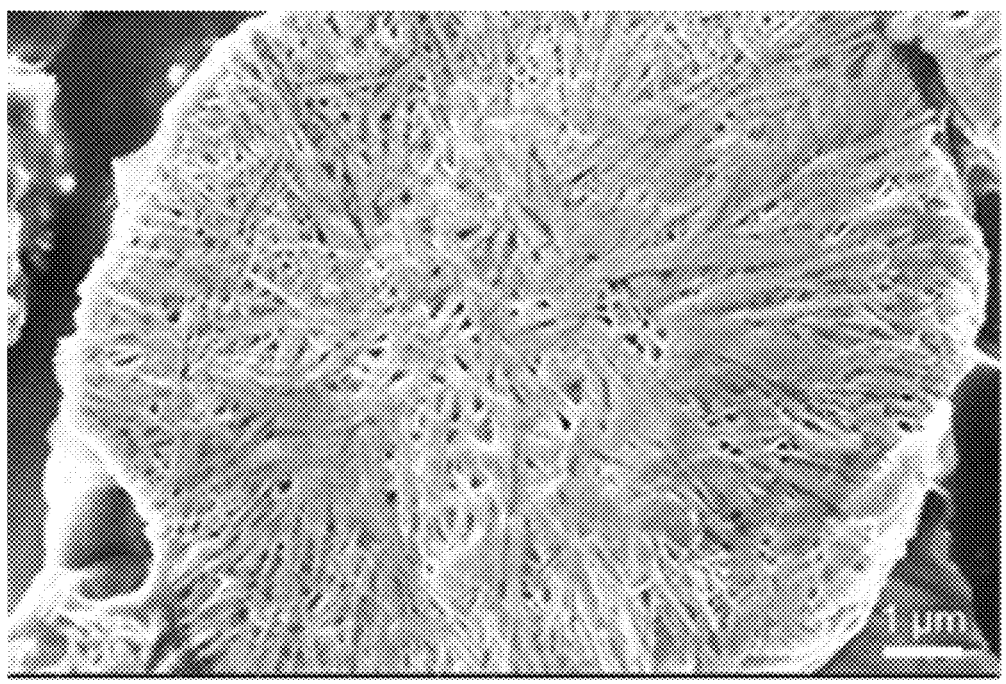
FIG. 3 is an SEM image showing the cross-section of the cathode material for sodium-ion batteries in Example 1 of the present application.

The technical solutions of the present application are further described below in terms of embodiments. It should be understood by those skilled in the art that the examples are merely intended to assist in understanding the present application and should not be regarded as specific limitations of the present application.

Example 1

This example provides a cathode material for sodium-ion batteries, and a preparation method for the cathode material for sodium-ion batteries comprises:

(1) A ternary sulfate solution of 2 mol/L with a metal molar ratio of Ni to Mn to Mg of 0.35:0.6:0.05, a NaOH solution of 10 mol/L, a sodium oxalate solution of 0.2 mol/L, a sodium borate solution of 1 mol/L, and ethylene glycol were injected into a 200 L continuous stirred tank reactor at a flow rate of 8 L/h, 3 L/h, 1.2 L/h, 0.1 L/h, and 0.2 L/h, respectively; under the condition of maintaining the reaction temperature at 40° C., pH at 10.2, and stirring rate at 350 rpm, the reaction was performed for 48 h, and after centrifugation, the reaction products were washed sequentially with 0.5 mol/L liquid sodium hydroxide and 60° C. hot water, and dried at 120° C. in the normal atmosphere for 24 h to obtain a B-doped radially-packed hydroxide precursor, and a doping amount of B was 5000 ppm; and (2) $Na_2CO_3$ and the precursor were mixed evenly according to a molar ratio of 1.05, and sintered at a high temperature of 900° C. for 15 h to obtain the cathode material for sodium-ion batteries.

Example 2

This example provides a cathode material for sodium-ion batteries, and a preparation method for the cathode material for sodium-ion batteries comprises:

(1) A ternary sulfate solution of 1.8 mol/L with a metal molar ratio of Ni to Mn to Mg of 0.35:0.6:0.05, a NaOH solution of 8 mol/L, a sodium oxalate solution of 0.3 mol/L, a sodium borate solution of 2 mol/L, and ethanol were injected into a 200 L continuous stirred tank reactor at a flow rate of 8.2 L/h, 3.2 L/h, 1.3 L/h, 0.12 L/h, and 0.25 L/h, respectively; under the condition of maintaining the reaction temperature at 40° C., pH at 10, and stirring rate at 350 rpm, the reaction was performed for 48 h, and after centrifugation, the reaction products were washed sequentially with 0.5 mol/L liquid sodium hydroxide and 60° C. hot water, and dried at 120° C. in the normal atmosphere for 24 h to obtain a B-doped radially-packed hydroxide precursor, and a doping amount of B was 10000 ppm; and (2) $Na_2CO_3$ and the precursor were mixed evenly according to a molar ratio of 1.1, and sintered at a high temperature of 900° C. for 15 h to obtain the cathode material for sodium-ion batteries.

Example 3

This example differs from Example 1 only in that the concentration of the complexing agent in the reaction system was controlled at 1.5 mmol/L, and other conditions and parameters were exactly the same as in Example 1.

Example 4

This example differs from Example 1 only in that the concentration of the complexing agent in the reaction system was controlled at 3.0 mmol/L, and other conditions and parameters were exactly the same as in Example 1.

Example 5

This example differs from Example 1 only in that the pH of the reaction system was 8.5, and other conditions and parameters were exactly the same as in Example 1.

Example 6

This example differs from Example 1 only in that the pH of the reaction system was 12.5, and other conditions and parameters were exactly the same as in Example 1.

Comparative Example 1

This comparative example differs from Example 1 only in that the organic additive was not added, and other conditions and parameters were exactly the same as in Example 1.

Comparative Example 2

This comparative example differs from Example 1 only in that the boron source was not added, and other conditions and parameters were exactly the same as in Example 1.

Battery assembly and performance test: the prepared cathode material for sodium-ion batteries, conductive carbon black, and a binder PVDF were weighed out according to a mass ratio of 7.5:1.5:1, and the above materials were evenly dispersed in N-methylpyrrolidone (NMP) to prepare a conductive slurry, then the slurry was coated on an aluminum foil, dried at 70° C., and then cut and weighed. The battery type was a button battery of model CR2032, with glass fibers employed as the separator, a sodium metal sheet employed as the anode, and 1 M $NaPF_6$ EC/DMC=1:1 employed as the electrolyte. The half-battery was assembled according to the order of the sodium metal sheet, the separator, the cathode sheet, the spacer, and the spring sheet in a glove box filled with Ar gas. The assembled CR2032 button half-battery was subjected to electrochemical tests within the voltage window of 2.5-4.2 V (vs $Li/Li^+$).

The test results are shown in Table 1.

TABLE 1

| | Discharge capacity at 0.1 C (mAh/g) | Discharge capacity at 2 C (mAh/g) | Capacity retention rate after 100 cycles |
|---|---|---|---|
| Example 1 | 143 | 108 | 92.78% |
| Example 2 | 138 | 105 | 87.53% |
| Example 3 | 132 | 98 | 85.06% |
| Example 4 | 129 | 92 | 83.09% |
| Example 5 | 130 | 91 | 86.98% |
| Example 6 | 124 | 87 | 85.42% |
| Comparative Example 1 | 98 | 42 | 43.24% |
| Comparative Example 2 | 82 | 37 | 45.21% |

As can be seen from Table 1, it can be found from Examples 1-2 that the battery prepared from the cathode material for sodium-ion batteries in the present application has a discharge capacity at 0.1 C of more than or equal to 138 mAh/g, a discharge capacity at 2 C of more than or equal to 105 mAh/g, and a capacity retention rate after 100 cycles of more than or equal to 87.53%, which indicates that an appropriate doping amount of B improves the structure stability and the cycle performance.

It can be found from the comparison of Example 1 and Examples 3-6 that in the preparation process of the cathode material for sodium-ion batteries in the present application, when the pH of the reaction system is controlled at 9-12 and the concentration of the complexing agent in the reaction system is controlled at 1.5-3.0 mmol/L, the radially-packed cathode material for sodium-ion batteries can be prepared. If the reaction conditions are beyond the ranges or inappropriately matched, the prepared precursor will be in random packing mode or close-packed planar stacking mode, or even the spherical precursors cannot be prepared.

It can be found from the comparison of Example 1 and Comparative Example 1 that in the preparation process of the cathode material for sodium-ion batteries in the present application, the organic additive is required to be added to prepare the radially-packed cathode material for sodium-ion batteries. The organic additive can be adsorbed on the specific crystal plane of the precursor, so as to contribute to the orientation growth of the crystal plane to obtain the radially-packed cathode material for sodium-ion batteries.

It can be found from the comparison of Example 1 and Comparative Example 2 that in the present application, by doping the non-metallic element B, the strong covalent B—O bond is constructed, so that oxygen atoms have more negative charges to reduce the excessive oxidation of oxygen effectively, thereby improving the lattice oxygen stability in the process of high-voltage deep sodium deintercalation, inhibiting multiple phase transition reactions, and increasing the voltage plateau and cycling stability simultaneously.

What is claimed is:

1. A preparation method for a cathode material for sodium-ion batteries, which comprises the following steps:
   (1) mixing a nickel source, a manganese source, and a magnesium source to obtain a ternary salt solution, adding the ternary salt solution, a precipitating agent, a complexing agent, a boron source solution, and an organic additive to a reaction vessel in parallel flow, and performing a reaction to obtain a B-doped radially-packed hydroxide precursor;
   the precipitating agent comprises a sodium hydroxide solution with a concentration of 6-10 mol/L;
   the complexing agent comprises any one or a combination of at least two of aqueous ammonia, oxalic acid, sodium oxalate, or salicylic acid;
   the organic additive comprises any one or a combination of at least two of ethanol, ethylene glycol, or cetyltrimethylammonium bromide;
   the reaction is performed at a pH of 9-12;
   for a system of the reaction, the complexing agent has a concentration of 1.5-3.0 mmol/L; and
   (2) mixing the B-doped radially-packed hydroxide precursor obtained in step (1) with a sodium source, and performing sintering treatment to obtain the cathode material for sodium-ion batteries.

2. The preparation method according to claim 1, wherein the nickel source in step (1) comprises any one or a combination of at least two of nickel sulfate, nickel chloride, or nickel nitrate.

3. The preparation method according to claim 1, wherein the manganese source in step (1) comprises any one or a combination of at least two of manganese sulfate, manganese chloride, or manganese nitrate.

4. The preparation method according to claim 1, wherein the magnesium source in step (1) comprises any one or a combination of at least two of magnesium sulfate, magnesium chloride, or magnesium nitrate.

5. The preparation method according to claim 1, wherein metal ions in the ternary salt solution in step (1) have a total concentration of 0.5-2.0 mol/L.

6. The preparation method according to claim 1, wherein a solute of the boron source solution in step (1) comprises any one or a combination of at least two of boric acid, boron oxide, or sodium borate.

7. The preparation method according to, claim 1, wherein the ternary salt solution in step (1) has a flow rate of 7-9 L/h;
   the precipitating agent in step (1) has a flow rate of 2-4 L/h;
   the complexing agent in step (1) has a flow rate of 1-1.5 L/h;
   the boron source solution in step (1) has a flow rate of 0.05-0.15 L/h;
   the organic additive in step (1) has a flow rate of 0.1-0.3 L/h.

8. The preparation method according to claim 1, wherein the reaction in step (1) is performed at a temperature of 30-60° C.

9. The preparation method according to claim 1, wherein the B in the B-doped radially-packed hydroxide precursor in step (1) has a doping amount of 2000-10000 ppm.

10. The preparation method according to claim 1, wherein the sodium source in step (2) comprises sodium hydroxide and/or sodium carbonate.

11. A cathode material for sodium-ion batteries, which is prepared by the method according to any one of claim 1.

12. A cathode sheet, which comprises the cathode material for sodium-ion batteries according to claim 11.

13. A sodium-ion battery, which comprises the cathode sheet according to claim 12.

14. The preparation method according to claim 1, wherein the boron source solution in step (1) has a concentration of 1-3 mol/L.

15. The preparation method according to claim 1, wherein the reaction in step (1) is performed at a stirring rate of 250-400 rpm.

16. The preparation method according to claim 1, wherein washing and drying are carried out after the reaction in step (1).

17. The preparation method according to claim 10, wherein a molar ratio of the sodium source to the hydroxide precursor is 1-1.2 in step (2).

18. The preparation method according to claim 1, wherein the sintering treatment in step (2) is performed at a temperature of 800-1000° C.;
   the sintering treatment in step (2) is performed for a period of 10-20 h.

19. The preparation method according to claim 16, wherein a washing agent of the washing in step (1) comprises any one or a combination of at least two of hot water, liquid sodium hydroxide, or ethanol.

\* \* \* \* \*